(12) United States Patent
Lee

(10) Patent No.: US 6,253,781 B1
(45) Date of Patent: Jul. 3, 2001

(54) PROCESS FOR CONTROLLING THE LEVEL OF AN AMMONIUM FLUORIDE-CONTAINING ACID SOLUTION IN AN ACID VESSEL

(75) Inventor: Ching-Lun Lee, Taipei (TW)

(73) Assignee: Winbond Electronics Corporation, Hsinchu (TW)

( * ) Notice: Subject to any disclaimer, the term of this patent is extended or adjusted under 35 U.S.C. 154(b) by 0 days.

(21) Appl. No.: 09/429,874

(22) Filed: Oct. 29, 1999

(51) Int. Cl.$^7$ .................................................... G01F 23/14
(52) U.S. Cl. .............................. 137/12; 137/391; 137/395
(58) Field of Search ........................................ 137/386, 391, 137/101.25, 395, 396, 12

(56) References Cited

U.S. PATENT DOCUMENTS

| | | | |
|---|---|---|---|
| 2,797,702 | * 7/1957 | Martin | 137/395 X |
| 3,714,823 | * 2/1973 | Wilkens et al. | 137/391 X |
| 4,257,437 | * 3/1981 | Pearson | 137/396 X |
| 4,639,738 | * 1/1987 | Young et al. | 347/89 |

* cited by examiner

Primary Examiner—Kevin Lee
(74) Attorney, Agent, or Firm—Fish & Richardson P.C.

(57) ABSTRACT

The present invention provides a process for controlling the level of an ammonium fluoride-containing acid solution in an acid vessel. First, a tube provided with at least one hole in the sidewall is used as a high level sensing tube for the acid solution in the acid vessel. Then, an inert gas is blown into the high level sensing tube. The pressure of the inert gas is measured such that the acid solution is charged when the pressure is a first value and the acid solution is drained when the pressure is a second value larger than the first value. By means of the process of the present invention, when the bottom of the high level sensing tube is jammed with ammonium fluoride crystals and the acid solution level has not reached a level submerging the at least one hole, the inert gas can flow out via the at least one hole and the pressure measured is the first value. Thus, the period of time before the dummy wet station is shut down due to the accumulation of ammonium fluoride crystals on the high level sensing tube can be prolonged. Consequently, the usage time of the acid solution can be greatly lengthened, the frequency of changing acid can be decreased, and the frequency of the preventive maintenance of the dummy wet station can be decreased, thus increasing production efficiency.

28 Claims, 3 Drawing Sheets

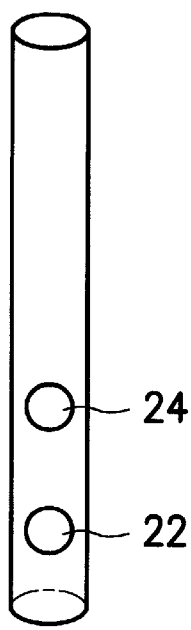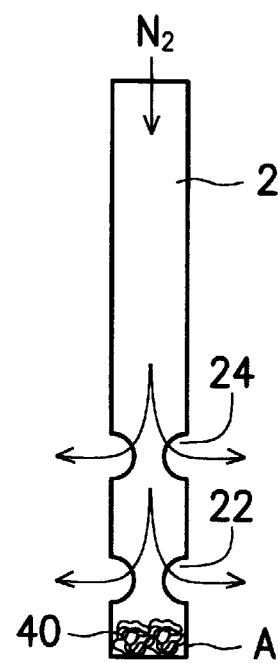
FIG. 5a   FIG. 5b
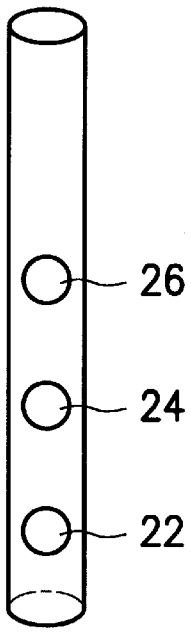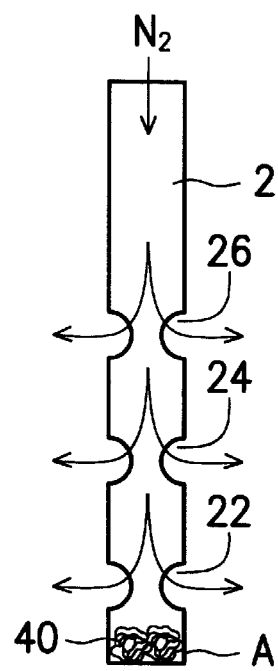
FIG. 6a   FIG. 6b

PROCESS FOR CONTROLLING THE LEVEL OF AN AMMONIUM FLUORIDE-CONTAINING ACID SOLUTION IN AN ACID VESSEL

BACKGROUND OF THE INVENTION

1. Field of the Invention

The present invention relates to a process for controlling the level of an ammonium fluoride-containing acid solution in an acid vessel, and more particularly to a process for prolonging the period of time before the dummy wet station is process abnormal stop due to the accumulation of ammonium fluoride crystals on the high level sensing tube by providing at least one hole in the sidewall of the high level sensing tube.

2. Description of the Prior Art

Nowadays, wafer cleaning is often conducted in a tool called dummy wet station (DWS). A batch of wafers is introduced in an acid vessel of the DWS for cleaning. Then, another batch of wafers is introduced in the acid vessel for cleaning. After many batches of cleaning, the acid solution in the acid vessel becomes dirty and needs to be replaced. A commonly used acid solution for cleaning is buffered HF (BHF), which includes hydrofluoric acid (HF) and ammonium fluoride ($NH_4F$).

During the process of adding the acid solution to the acid vessel, a low level sensor and a high level sensor are generally used to detect the level of the acid solution so as to control the acid solution level to reach a predetermined value. Referring to FIG. 1, the bottom portion of the tube 1 of the low level sensor is immersed in the acid solution 30 received in a vessel, while the bottom portion of the tube 2 of the high level sensor is disposed above the liquid surface of the acid solution. When the low level sensor detects that the liquid surface is too low, it will output a signal for introducing the acid solution into the vessel; thus, the process of introducing the acid solution proceeds. When the high level sensor detects that the liquid surface is too high, it will output a signal for draining the acid solution; thus, the acid solution is allow to flow out until the level of the acid solution reaches a predetermined value.

The principle of the high level sensor is described below. Nitrogen gas is introduced into the tube 2 of the high level sensor, hereinafter referred to as high level sensing tube, and the nitrogen pressure is detected by a CPU (central processing unit). Referring to FIG. 1, when the acid solution level has not reached the bottom A of the high level sensing tube 2, nitrogen can flow through the bottom A of the high level sensing tube and the nitrogen pressure is detected to as $P_1$. Referring to FIG. 2, when the acid solution level reaches the bottom A of the high level sensing tube 2, nitrogen can not easily flow through the bottom A of the high level sensing tube and the nitrogen pressure is detected to as $P_2$, which is certainly larger than $P_1$. When the CPU receives a signal that the nitrogen pressure is $P_2$, it indicates that the acid solution level has reached a high level. That is to say, no more acid solution should be added. Therefore, the CPU will output a signal for draining the acid solution until the nitrogen pressure received by the CPU is $P_1$. In this manner, the level of the acid solution can be controlled to a predetermined value; thus, the acid solution will not overflow.

When wafers are cleaned in the BHF solution, some ammonium fluoride contained in the BHF solution will crystallize on the wall of the high level sensing tube, thus jamming the tube. Referring to FIG. 3, when the acid solution level has not reached the bottom A of the high level sensing tube, but the bottom A is jammed with the ammonium fluoride crystals 40, nitrogen gas can not easily flow through the bottom A; therefore, the nitrogen pressure detected is $P_2$. As mentioned above, once the CPU receive the signal that the nitrogen pressure is $P_2$, it will output a signal for draining the acid solution until the nitrogen pressure received by the CPU is $P_1$. However, even if some acid solution is drained, the nitrogen pressure is still $P_2$ and can not become $P_1$, since the bottom A of the high level sensing tube has been jammed. Thus, the CPU will continually output the draining signal, and the acid solution will eventually become empty. When the acid solution is drained, the DWS tool should be totally shut down and can not operate, and the process is interrupted. This increases the frequency of preventive maintenance (PM) and also causes waste of the acid solution, thus decreasing production efficiency.

SUMMARY OF THE INVENTION

Therefore, an object of the present invention is to solve the above-mentioned problems and to provide a process for controlling the level of an ammonium fluoride-containing acid solution in an acid vessel. By means of the process of the present invention, the period of time before the dummy wet station is shut down due to the accumulation of ammonium fluoride crystals on the high level sensing tube can be prolonged. Consequently, the usage time of the acid solution can be greatly lengthened, the frequency of changing acid can be decreased, and the frequency of the preventive maintenance of the dummy wet station can be decreased, thus increasing production efficiency.

The above object of the present invention can be achieved by the following process. First, a tube provided with at least one hole on the sidewall is used as a high level sensing tube for an acid solution in an acid vessel. Then, an inert gas is blown into the high level sensing tube. The pressure of the inert gas is measured continuously during the entire process from charging the acid solution to draining the acid solution completely. When the pressure is a first value, the acid solution is charged. When the pressure is a second value larger than the first value, the acid solution is drained. The acid solution level can thus be controlled.

In addition, the present invention provides a high level sensing tube for controlling the level of an ammonium fluoride-containing acid solution in an acid vessel. The high level sensing tube is provided with at least one hole in the sidewall. When an inert gas is blown into the high level sensing tube and the pressure of the inert gas is measured such that charging the acid solution when the pressure is a first value and draining the acid solution when the pressure is a second value larger than the first value, if the bottom of the high level sensing tube is jammed by ammonium fluoride crystals and the acid solution level has not reached a level submerging the at least one hole, the inert gas can flow out via the at least one hole.

The present invention also provides a process for prolonging the usage time of an ammonium fluoride-containing acid solution in an acid vessel in a dummy wet station. A tube provided with at least one hole in the sidewall is used as a high level sensing tube for the acid solution. An inert gas is blown into the high level sensing tube. The pressure of the inert gas is measured such that charging the acid solution when the pressure is a first value and draining the acid solution when the pressure is a second value larger than the first value. By this manner, when the bottom of the high level sensing tube is jammed with ammonium fluoride crystals and the acid solution level has not reached a level submerging the at least one hole, the inert gas can flow out via the at least one hole and the pressure measured is the first value; thus, the acid solution is charged and the dummy wet station is not shut down.

BRIEF DESCRIPTION OF THE DRAWINGS

The present invention will become more fully understood from the detailed description given hereinbelow and the accompanying drawings, given by way of illustration only and thus not intended to be limitative of the present invention.

FIG. 5a shows a perspective view and FIG. 5b shows a longitudinal cross-sectional view of a high level sensing tube according to a second embodiment of the present invention, wherein the bottom of the tube is jammed and nitrogen gas can flow out via holes.

FIG. 6a shows a perspective view and FIG. 6b shows a longitudinal cross-sectional view of a high level sensing tube according to a third embodiment of the present invention, wherein the bottom of the tube is jammed and nitrogen gas can flow out via holes.

DETAILED DESCRIPTION OF THE INVENTION

According to the present invention, the present invention uses a tube provided with in the sidewall one hole as a high level sensing tube for an ammonium fluoride-containing acid solution in an acid vessel. Such an acid solution contains hydrofluoric acid (HF) and ammonium fluoride ($NH_4F$) and can be used for cleaning wafers or etching semiconductor devices.

Figure 1:
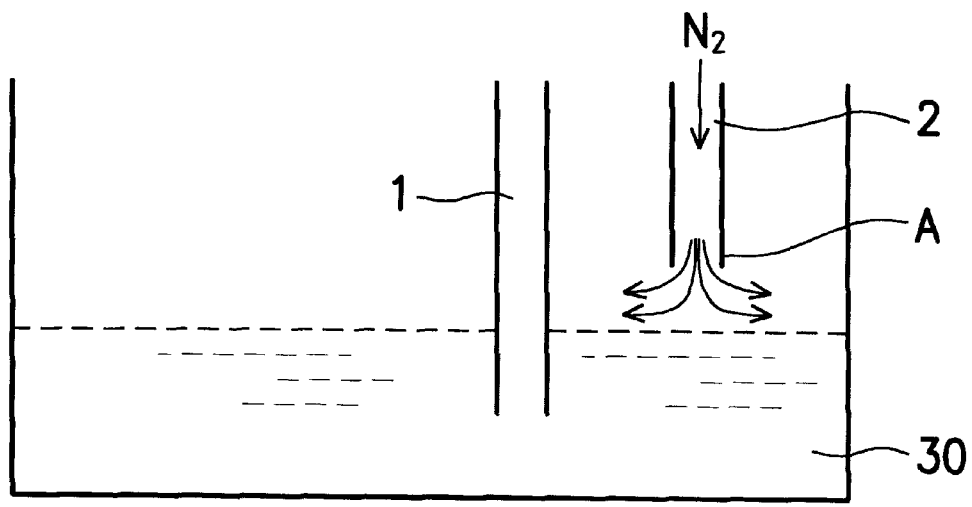
FIG. 1 shows a high level sensing tube for a conventional acid solution, wherein nitrogen gas can flow through the bottom of the tube.
Figure 2:
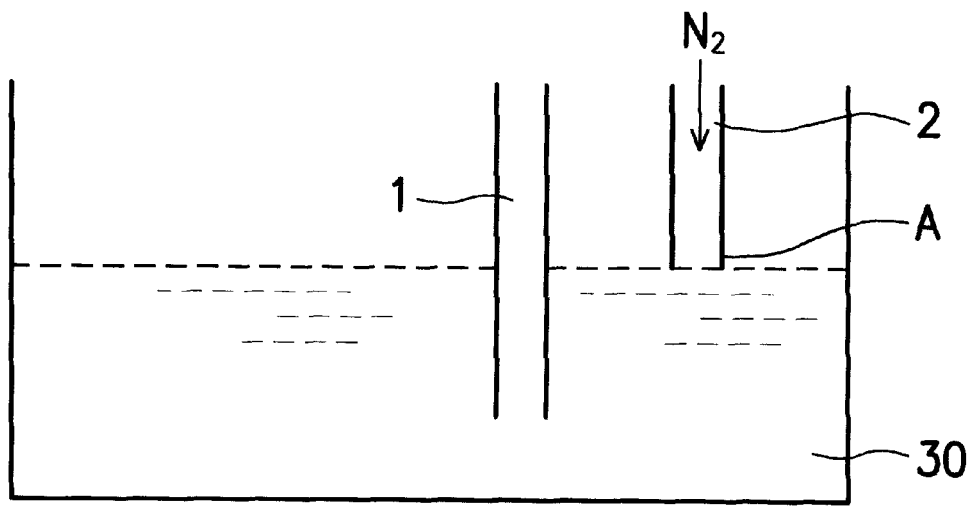
FIG. 2 shows a high level sensing tube for a conventional acid solution, wherein nitrogen gas can not flow through the bottom of the tube, since the acid solution level has reached the bottom.
Figure 3:
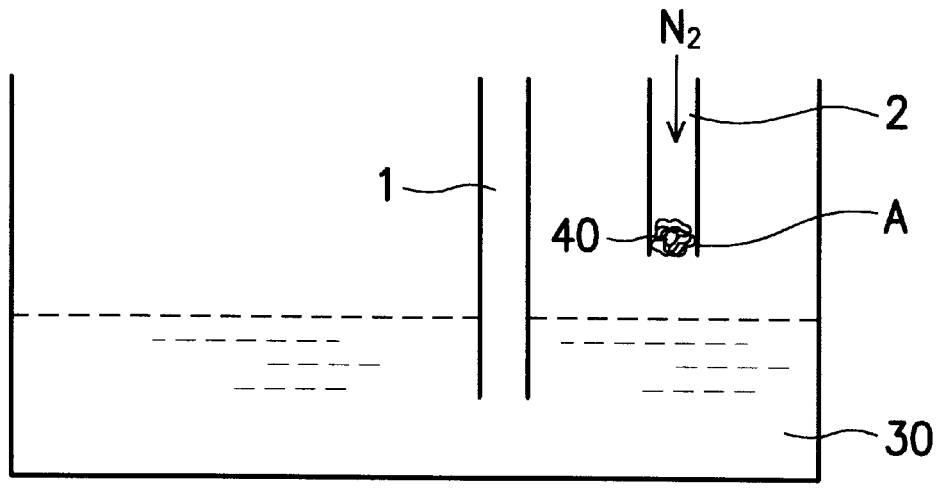
FIG. 3 shows a high level sensing tube for a conventional acid solution, wherein nitrogen gas can not flow through the bottom of the tube, since the bottom of the tube is jammed.
Figures 4A, 4B:
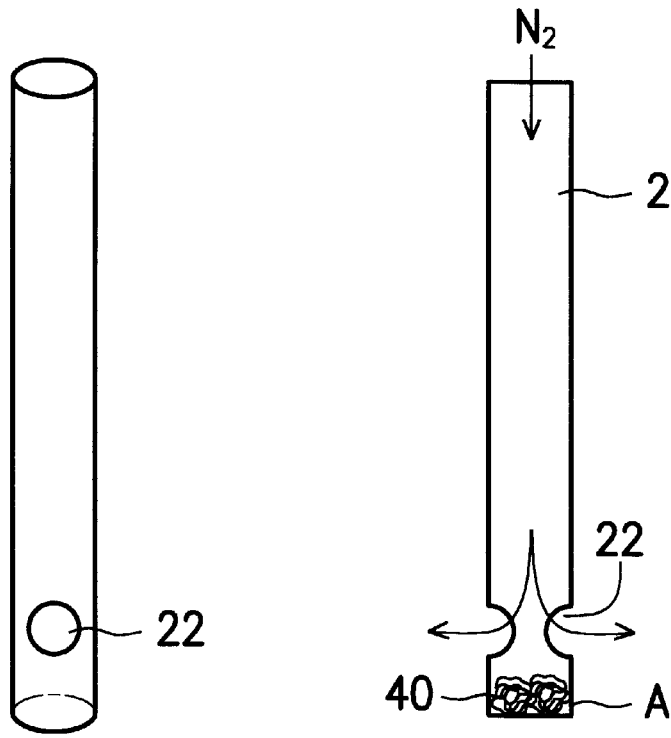
FIG. 4a shows a perspective view and FIG. 4b shows a longitudinal cross-sectional view of a high level sensing tube according to a first embodiment of the present invention, wherein the bottom of the tube is jammed and nitrogen gas can flow out via holes.

FIG. 4a shows a perspective view and FIG. 4b shows a longitudinal cross-sectional view of a high level sensing tube according to a first embodiment of the present invention. The high level sensing tube 2 is provided with a pair of oppositely disposed holes, which are referred to a first pair of holes 22. An inert gas, such as nitrogen or argon gas, is blown into the high level sensing tube. By means of measuring the pressure of the inert gas, we can control the level of the acid solution.

The way on how to control the acid solution level is described as follows. First, the acid solution is charged into an acid vessel in which the high level sensing tube 2 is installed. The pressure of the inert gas is continuously measured during the entire process from charging the acid solution to draining the acid solution completely. When the acid solution level has not reached a level submerging the holes 22, but the bottom A is jammed with the ammonium fluoride crystals 40, although nitrogen can not flow through the bottom A, it can flow out via the holes 22. Therefore, the nitrogen pressure detected is still $P_1$. The CPU will output the charging acid solution signal. Thus, when the pressure is $P_1$, the acid solution is continuously charge. Once the acid solution level reaches a level submerging the holes 22, nitrogen can not flow out via the holes 22 anymore; therefore, the nitrogen pressure detected becomes $P_2$ which is larger than $P_1$. When the pressure is $P_2$, the CPU will output a signal for draining the acid solution until the pressure becomes $P_1$, that is, until the acid solution level is below the holes 22. At that time, since nitrogen can again flow via the holes 22.

Eventually, the accumulation of crystals 40 of ammonium fluoride deposited on the high level sensing tube will increase until even the holes 22 may be jammed by the ammonium fluoride crystals. At that time, since nitrogen can not flow via the holes 22, the nitrogen pressure becomes $P_2$. The CPU outputs a signal for draining the acid solution. No matter how much acid solution is drained, the nitrogen pressure is still $P_2$ and can not become $P_1$, since nitrogen can not flow out via any hole or through the bottom A. Thus, the CPU will continually output the draining signal, and the acid solution will eventually become empty. At that time, the DWS should be totally shut down and can not operate, and the process is interrupted.

As described above, by means of using the high level sensing tube of the present invention, even though the bottom of the high level sensing tube is jammed by ammonium fluoride crystals, the dummy wet station will not be shut down if nitrogen can flow via the holes provided on the sidewall of the high level sensing tube. Therefore, the cleaning of wafers can still continue. Since the dummy wet station does not stop at that time, both PM (preventive maintenance) and changing acid procedure are not conducted, thus decreasing production cost and increasing production efficiency.

FIG. 5a shows a perspective view and FIG. 5b shows a longitudinal cross-sectional view of a high level sensing tube according to a second embodiment of the present invention. The high level sensing tube 2 is provided with two pairs of oppositely disposed holes, which are a first holes 22 and a second pair of holes 24. By means of such a design, when the acid solution level has not reached the level submerging the holes 22 or 24, but the bottom A is jammed with the ammonium fluoride crystals 40, although nitrogen can not flow through the bottom A, it can flow out via the holes 22 and 24. Therefore, the nitrogen pressure detected is still $P_1$. Thus, the CPU will not output the draining acid signal, the dummy wet station will not be shut down, and the cleaning of wafers can still continue. If the ammonium fluoride crystal amount is very large, and some of the holes is jammed by the crystals, once at least one hole 24 is not jammed, then nitrogen gas can still flow out via the at least one hole 24. Thus, the dummy wet station is not shut down.

FIG. 6a shows a perspective view and FIG. 6b shows a longitudinal cross-sectional view of a high level sensing tube according to a third embodiment of the present invention. The high level sensing tube 2 is provided with three pairs of oppositely disposed holes, which are a first pair of holes 22, a second pair of holes 24, and a third pair of holes 26. By means of such a design, when the acid solution level has not reached the position of covering the holes 22, 24, or 26, but the bottom A is jammed with the ammonium fluoride crystals 40, although nitrogen can not flow through the bottom A, it can flow out via the holes 22, 24 or 26. Therefore, the nitrogen pressure detected is still $P_1$. Thus, the CPU will not output the draining acid signal, the dummy wet station is not shut down, and the cleaning of wafers can still continue. If the ammonium fluoride crystal amount is very large, and some of the holes are jammed by the crystals, as long as at least one hole 26 is not jammed, then nitrogen gas can still flow out via the at least one hole 26. Thus, the dummy wet station is not shut down.

As mentioned above, the feature of the present invention resides in using a high level sensing tube provided with at least one hole in the sidewall. Thus, when the acid solution level has not reached the at least one hole, but the bottom is jammed with the ammonium fluoride crystals, nitrogen gas can flow out via the at least one hole. Thus, the dummy wet station will not be shut down.

The number of the holes provided on the high level sensing tube is not limited. For example, a pair, two pairs, or three pairs of holes can be provided on the high level sensing tube. The position of the holes is not limited. When a pair of holes are provided on the high level sensing tube, they are preferably provided on locations ranging from a fifth (1/5) to four fifths (4/5) of the height of the high level sensing tube, respectively, most preferably on a fifth. When two pairs of holes are provided on the high level sensing tube, they are preferably provided on locations of a fifth and a second of the height of the high level sensing tube, respectively. When three pairs of holes are provided on the high level sensing tube, they are preferably provided on locations of a fifth (1/5), a second (1/2), and seven tenths (7/10) of the height of the high level sensing tube, respectively.

The following examples are intended to illustrate the process and the advantages of the present invention more fully without limiting its scope, since numerous modifications and variations will be apparent to those skilled in the art.

COMPARATIVE EXAMPLE 1

A tube having a diameter of 1 cm and a length of 5 cm (no hole) was used as the high level sensing tube for the BHF ($HF:NH_4F=1:6$ in volume) vessel in a DWS (dummy wet station). The BHF solution level was controlled by means of blowing nitrogen gas into the high level sensing tube and measuring the nitrogen pressure.

The above BHF vessel was used for cleaning wafers in batch. The wafers were cleaned in the BHF vessel, rinsed in a water vessel, and finally spin dried. After 80 hours of cleaning, the dummy wet station alarmed and was shut down.

EXAMPLE 1

The procedures were employed as described in Comparative Example 1, except that the high level sensing tube used is different, having two pairs of oppositely disposed holes as shown in FIGS. 5a and 5b. The distance between the holes 22 and the bottom of the tube was 1 cm, and the distance between the holes 22 and the holes 24 was 1.5 cm. The dummy wet station neither alarmed nor stopped until 278 hours of cleaning.

EXAMPLE 2

The procedures were employed as described in Comparative Example 1, except that the high level sensing tube used is different, having three pairs of oppositely disposed holes as shown in FIGS. 6a and 6b. The distance between the holes 22 and the bottom of the tube was 1 cm, the distance between the holes 22 and the holes 24 was 1.5 cm, and the distance between the holes 26 and the holes 24 was 1 cm. The dummy wet station neither alarmed nor stopped until 476 hours of cleaning.

From the above results, it can be seen that the usage time of the BHF solution can be lengthened 198 hours by using a high level sensing tube having two pairs of holes and 396 hours by using a high level sensing tube having three pairs of holes. Therefore, by means of the high level sensing tube provided with holes, the usage time of the acid solution can be greatly lengthened, the frequency of changing acid can be decreased, and the frequency of the preventive maintenance of the tool can be decreased, thus increasing production efficiency.

The foregoing description of the preferred embodiments of the present invention has been provided for the purpose of illustration and description. It is not intended to be exhaustive or to limit the invention to the precise forms disclosed. Many modifications and variations will be apparent to practitioners skilled in the art. The embodiments were chosen and described to best explain the principles of the invention and its practical application, thereby enabling others skilled in the art to under stand the invention to practice various other embodiments and make various modifications suited to the particular use contemplated. It is intended that the scope of the invention be defined by the following claims and their equivalents.

What is claimed is:

1. A process for controlling the level of an acid solution in an acid vessel, comprising the steps of:
    disposing an open end of a high level sensing tube at a position in the acid vessel corresponding approximately to a desired high level of the acid solution, the high level sensing tube having a sidewall defining at least one hole therein;
    introducing an inert gas into the high level sensing tube;
    measuring the pressure of the inert gas;
    charging the acid solution if the pressure is equal to a first predetermined value; and
    draining the acid solution if the pressure is equal to a second predetermined value larger than the first predetermined value.

2. The process as claimed in claim 1, wherein the acid solution in the acid vessel includes hydrofluoric acid and ammonium fluoride.

3. The process as claimed in claim 2, wherein the acid solution in the acid vessel is used for cleaning wafers.

4. The process as claimed in claim 2, wherein the acid solution in the acid vessel is used for etching semiconductor devices.

5. The process as claimed in claim 1, wherein the high level sensing tube is provided with a pair of oppositely disposed holes.

6. The process as claimed in claim 5, wherein the pair of holes are provided on locations ranging from a fifth to four fifths of the height of the high level sensing tube, respectively.

7. The process as claimed in claim 6, wherein the pair of holes are provided on a location of a fifth of the height of the high level sensing tube.

8. The process as claimed in claim 1, wherein the high level sensing tube is provided with two pairs of oppositely disposed holes.

9. The process as claimed in claim 8, wherein the two pairs of holes are provided on locations of a fifth and a second of the height of the high level sensing tube, respectively.

10. The process as claimed in claim 1, wherein the high level sensing tube is provided with three pairs of oppositely disposed holes.

11. The process as claimed in claim 10, wherein the three pairs of holes are provided on locations of a fifth, a second, and seven tenths of the height of the high level sensing tube, respectively.

12. The process as claimed in claim 1, wherein the inert gas is nitrogen or argon.

13. The process as claimed in claim 1, wherein the inert gas comprises argon.

14. The process as claimed in claim 1, where the first predetermined value is equal to the pressure of the inert gas when pumped out the open end and at least one hole of the high level sensing tube while the open end at least one hole are above the surface of the acid solution.

15. The process as claimed in claim 1, where the second predetermined value is equal to the pressure of the inert gas when pumped out the open end and at least one hole of the high level sensing tube while the open end and at least one hole are submerged below the surface of the acid solution.

16. A high level sensing tube for controlling the level of an acid solution in an acid vessel of a wet station provided with an inert gas supply, a measuring device capable of measuring the pressure of the inert gas, and a control device in electrical communication with the measuring device, wherein the control device outputs a charge acid solution signal if the measured pressure of the inert gas is equal to a first predetermined value, and the control device outputs a drain acid solution signal if the measured pressure of the inert gas is equal to a second predetermined value larger than the first predetermined value, the high level sensing tube comprising:
   a tube having an open end disposed at a position in the acid vessel corresponding approximately to a desired high level of acid solution, a second end connected to the inert gas supply, and a sidewall defining at least one hole.

17. The high level sensing tube as claimed in claim 16, wherein the tube defines a pair of oppositely disposed holes.

18. The high level sensing tube as claimed in claim 17, wherein the pair of holes are provided on locations ranging from a fifth to four fifths of the height of the tube, respectively.

19. The high level sensing tube as claimed in claim 18, wherein the pair of holes are provided on a location of a fifth of the height of the tube.

20. The high level sensing tube as claimed in claim 16, wherein the tube defines two pairs of oppositely disposed holes.

21. The high level sensing tube as claimed in claim 20, wherein the two pairs of holes are provided on locations of a fifth and a second of the height of the tube, respectively.

22. The high level sensing tube as claimed in claim 16, wherein the tube defines three pairs of oppositely disposed holes.

23. The high level sensing tube as claimed in claim 22, wherein the three pairs of holes are provided on locations of a fifth, a second, and seven tenths of the height o the tube, respectively.

24. The high level sensing tube as claimed in claim 16, where the first predetermined value is equal to the pressure of the inert gas when pumped out the end at least one hole of the high level sensing tube while the open end at least one hole are above the surface of the acid solution.

25. The high level sensing tube as claimed in claim 16, where the second predetermined value is equal to the pressure of the inert gas when pumped out the end and at least one hole of the high level sensing tube while the open end and at least one hole are submerged below the surface o the acid solution.

26. An apparatus for controlling the level of an acid solution in an acid vessel, comprising:
   an inert gas supply;
   a high level sensing tube having a first end, a second end and at least one hole in a sidewall, the first end being open and disposed at a position in the acid vessel corresponding approximately to a desired high level of acid solution, and the second end being connected to the inert gas supply;
   a measuring device capable of measuring the pressure of the inert gas; and
   a control device in electrical communication with the measuring device;
   wherein the control device outputs a charge acid solution signal if the measured pressure of the inert gas is equal to a first predetermined value, and the control device outputs a drain acid solution signal if the measured pressure of the inert gas is equal to a second predetermined value larger than the first predetermined value.

27. The apparatus as claimed in claim 26, where the first predetermined value is equal to the pressure of the inert gas when pumped out the end and at least one hole of the high level sensing tube while the open end and at least one hole are above the surface of the acid solution.

28. The apparatus as claimed in claim 26, where the second predetermined value is equal to the pressure of the inert gas when pumped out the end and at least one hole of the high level sensing tube while the open end and at least one hole are submerged below the surface of the acid solution.

* * * * *